(12) United States Patent
Noessing

(10) Patent No.: US 9,014,367 B2
(45) Date of Patent: Apr. 21, 2015

(54) DC/DC CONVERTER FOR A SUBSCRIBER LINE INTERFACE CIRCUIT, SYSTEM, METHOD AND APPARATUS

(71) Applicant: Lantiq Deutschland, Neubiberg (DE)

(72) Inventor: Gerhard Noessing, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 13/887,441

(22) Filed: May 6, 2013

(65) Prior Publication Data

US 2014/0328476 A1    Nov. 6, 2014

(51) Int. Cl.
*H04M 1/00* (2006.01)
*H04M 3/00* (2006.01)

(52) U.S. Cl.
CPC ................................ *H04M 3/007* (2013.01)
USPC ...................... 379/399.01; 379/413

(58) Field of Classification Search
USPC ................... 379/93.06, 399.01, 413
See application file for complete search history.

(56) References Cited

U.S. PATENT DOCUMENTS

| | | | |
|---|---|---|---|
| 6,985,560 B1* | 1/2006 | Burnett | 379/22.01 |
| 2007/0268009 A1* | 11/2007 | Duan | 323/282 |
| 2009/0092243 A1 | 4/2009 | Mitrea et al. | |
| 2009/0245504 A1 | 10/2009 | Wahby et al. | |

FOREIGN PATENT DOCUMENTS

CN    100 512 327 C    7/2009

OTHER PUBLICATIONS

European Office Action for corresponding Application No. 13 166 657.0, mailed Oct. 21, 2013, 6 pages.

* cited by examiner

*Primary Examiner* — Creighton Smith

(57) ABSTRACT

A subscriber line interface circuit (SLIC) is herein described. In accordance with one aspect of the present proffered solution, the SLIC includes a first interface circuit operably coupled to a first subscriber loop and a second interface circuit operably coupled to a second subscriber loop. The SLIC further includes a power supply circuit that is coupled to the first and second interface circuits to provide first and second output voltages to the respective interface circuits. The power supply circuit includes a switching power converter that is operably supplied with an input voltage and is configured to provide an intermediate voltage signal at an intermediate circuit node. At least a first and a second output branch are connected to the intermediate circuit node. Each output branch includes an output capacitor that is coupled to the intermediate circuit node and that provides an output voltage signal that depends on the intermediate voltage signal. The switching power converter is configured to repeatedly set the signal level of the intermediate voltage signal to a high voltage level for a first time interval and to a low voltage level when the first time interval has elapsed.

19 Claims, 2 Drawing Sheets

DC/DC CONVERTER FOR A SUBSCRIBER LINE INTERFACE CIRCUIT, SYSTEM, METHOD AND APPARATUS

SUMMARY

A DCDC converter is herein described. In accordance with one aspect of the present proffered solution, the DCDC Converter is applicable in a subscriber line interface circuit (SLIC) setting. The DCDC Converter includes a first interface circuit operably coupled to a first subscriber loop and a second interface circuit operably coupled to a second subscriber loop. There is further provided a power supply circuit that is coupled to the first and second interface circuits to provide first and second output voltages to the respective interface circuits. The power supply circuit includes a switching power converter that is operably supplied with an input voltage and is configured to provide an intermediate voltage signal at an intermediate circuit node. At least a first and a second output branch are connected to the intermediate circuit node. Each output branch includes an output capacitor that is coupled to the intermediate circuit node and that provides an output voltage signal that depends on the intermediate voltage signal. The switching power converter is configured to repeatedly set the signal level of the intermediate voltage signal to a high voltage level for a first time interval and to a low voltage level when the first time interval has elapsed.

Furthermore, a method for supplying power to a first and a second subscriber terminal is herein described, whereby the subscriber terminals are operably coupled to corresponding subscriber loops. In accordance with a further aspect of the present proffered solution, the method comprises repeatedly charging a first and a second capacitor to a high voltage level during a first time interval, and preventing discharging of the first and second capacitors to voltage levels lower than a given low voltage level when the first time interval has elapsed. The first and second capacitors provide power to the first and second subscriber terminals, respectively, via corresponding interface circuits coupled to the respective subscriber terminals by the respective subscriber loops.

BRIEF DESCRIPTION OF THE DRAWINGS

The proffered solution can be better understood with reference to the following drawings and descriptions. The components in the figures are not necessarily to scale; emphasis is instead placed upon illustrating the principles of the proffered solution. Moreover, in the figures, like reference numerals designate corresponding parts. In the drawings.

DESCRIPTION

Subscriber line interface circuits are typically used in telephone exchanges (telephone switches) of telecommunications networks. A subscriber line interface circuit (SLIC) provides a communication interface between a network operator's digital communication network and an analog subscriber line. The analog subscriber line connects to a subscriber station (e.g., a modem or a telephone, generally referred to as "subscriber equipment") at a location remote from the exchange. SLICs are also used in cable modems and digital subscriber line (DSL) modems (or any other type of modem) where voice signals are received, e.g., via voice over internet protocol (VoIP) and then converted into an analog voice signal compatible with analog subscriber terminal equipment, particularly POTS terminal equipment (POTS=plain old telephone system). In this case the modem acts as a small "telephone exchange" remote from the central office. Today standard modems (e.g. cable modems), which are located in the subscriber's premises, include two interfaces for connecting analog telephones.

The analog subscriber line and subscriber equipment form a subscriber loop. The SLIC usually needs to provide relatively high voltages and currents for control signaling with respect to the subscriber equipment on the subscriber loop. For bi-directional communication, the SLIC transforms digital data received from the digital network into low voltage analog signals for transmission on the subscriber loop to the subscriber equipment and vice versa. Generally, an SLIC usually uses different power supply levels depending on the operational state of the subscriber equipment. A first supply level is used when the subscriber equipment is "on hook" (standby mode) and a different, second supply level is used when the subscriber equipment is "off hook" (active mode). Two-channel or multi-channel SLICs provide the same functionality for each channel. The channels operate independently but may share one power supply.

SLICs previously employed power supply circuits with linear voltage (or current) regulators to provide the different voltage (or current) levels, which is comparably inefficient in terms of power loss within the power supply circuit. More recent SLIC architectures use switching power converters (also known as switching-mode power supplies, or SMPS) to generate the appropriate supply voltage levels from a fixed DC input voltage. Although switching power converters are generally significantly more efficient as they allow for significantly less power loss, there is still a need for improvement to further reduce the power loss, particularly in the supply circuits of two-channel or multi-channel SLICs.

Figure 1:
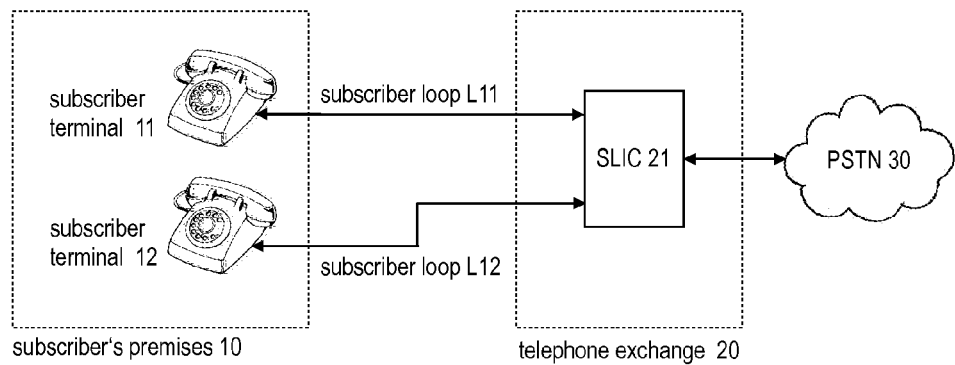
FIG. 1 is a block diagram illustrating an SLIC in a telephone exchange connected to a subscriber terminal located on the subscriber's premises.

FIG. 1 illustrates the conventional use of a subscriber line interface circuit (SLIC). SLIC 21 is, for example, located in telephone exchange (telephone switch) 20, which may be located within a service provider's central office or a subscriber loop carrier (SLC). Generally, SLIC 21 provides an interface between subscriber terminals 11 and 12 (e.g., telephones), which are located on subscriber's premises 10, and the service provider's (usually digital) telecommunications network, which may be part of public switched telephone network (PSTN) 30. In the present example, SLIC 21 includes two separate channels for interfacing with the two separate subscriber terminals 11 and 12. The lines connecting subscriber terminals 11 and 12 with SLIC 21 are usually referred to as "subscriber loops" or "subscriber lines" and are labeled L11 and L12 in FIG. 1. Subscriber loops L11 and L12 are usually implemented using twisted pair copper lines. Furthermore, SLIC 21 includes an interface for connecting to a digital telecommunications network, which is represented by PSTN 30 in FIG. 1.

Basically, subscriber terminals 11 and 12 may operate in two different modes, i.e., standby mode ("on-hook") and active mode ("off-hook"). SLIC 21 usually provides a relatively high DC voltage of, e.g., 42 to 48 volts to a connected subscriber terminal if this subscriber terminal is in standby mode. However, the subscriber terminals do not consume a significant supply current in standby mode. If the connected subscriber terminal is in active mode, SLIC 21 provides a constant current of about 25 milliamperes, wherein the subscriber terminal has an "off-hook" resistance of approximately 300 ohms. SLIC 21 thus provides a relatively low DC voltage of about 7.5 volts to a subscriber terminal in active mode. The mentioned current, voltage and resistance values have to be regarded as examples. The actual values are, however, usually defined by service providers, regulating authorities or legislators and may be different in different countries.

Figure 2:
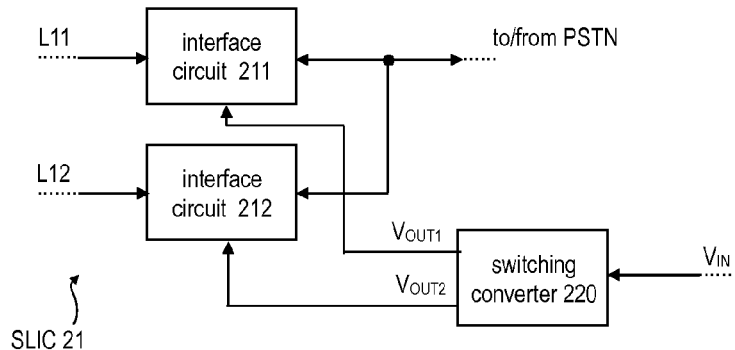
FIG. 2 is a block diagram illustrating one exemplary implementation of an SLIC in accordance with one example of the present proffered solution.

FIG. 2 illustrates the SLIC of FIG. 1 in more detail. In the present example, SLIC 21 includes the two interface circuits 211 and 212 for interfacing to the corresponding subscriber loops L11 and L12, respectively. Interface circuits 211 and 212 are both configured to receive signals from the connected subscriber terminals 11 and 12, respectively, to convert the signals in accordance with the used transmission standard and to transmit the converted signals to telecommunications network 30. Analogously, interface circuits 211 and 212 are both configured to receive signals from telecommunications network 30 to convert the signals appropriately to be transmitted to the desired subscriber terminal via the corresponding subscriber loop. In such a manner, a bi-directional transmission is accomplished. To provide the voltage and current levels mentioned above, interface circuits 211 and 212 are supplied using switching power converter 220. It should be noted that FIG. 2 is not a complete illustration of an SLIC. Components that are known as such and that are not relevant for the present discussion have been omitted for the sake of conciseness.

Switching power converter 220 may be a DC/DC converter that is supplied with input voltage $V_{IN}$ and configured to generate first and second output voltage signals $V_{OUT1}$ and $V_{OUT2}$. These output voltage signals $V_{OUT1}$ and $V_{OUT2}$ are supplied to interface circuits 211 and 212, respectively. The function and operation of switching power converter 220 will be described later with respect to FIGS. 4 and 5.

Figure 3:
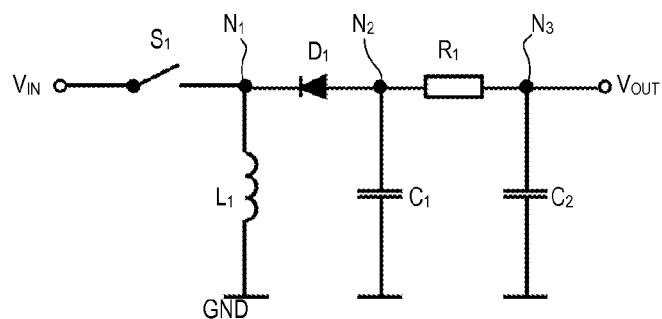
FIG. 3 is a circuit diagram illustrating a conventional switching power converter circuit suitable for use in an SLIC.
Figure 4:
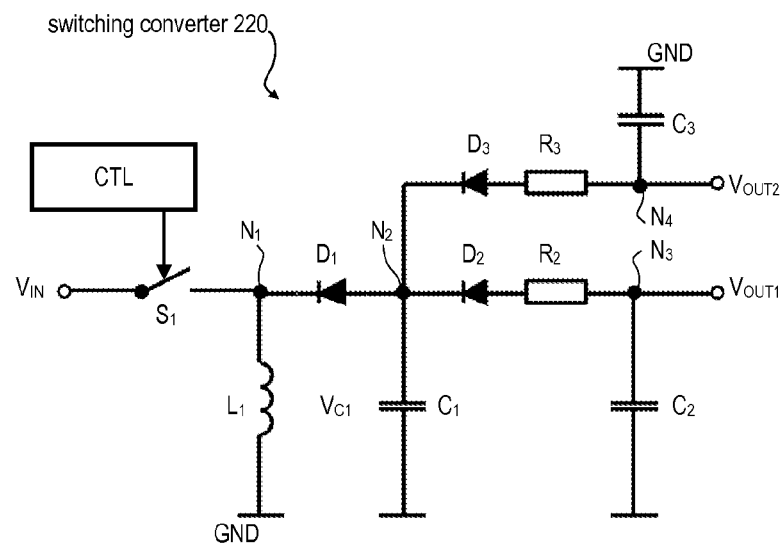
FIG. 4 is a circuit diagram illustrating an improved switching power converter circuit for use in a two-channel SLIC in accordance with one example of the present proffered solution.

FIG. 3 illustrates the basic setup of a single-output switching power converter conventionally used in SLICs. When using single-output switching power converters in a two-channel (or multi-channel) SLIC, either one separate switching power converter has to be provided for each channel or, alternatively, the same output voltage signal $V_{OUT}$ has to be provided to both channels. Both options have undesired consequences. Providing two separate switching power converters is a rather expensive solution, whereas using the same output voltage $V_{OUT}$ for both channels (i.e., for both interface circuits 211 and 212) entails extensive power loss, particularly when the subscriber terminal connected to the first channel is in active mode and the subscriber terminal connected to the second channel is in standby mode. In this case, the switching power converter would have to provide the high voltage level (e.g., 42 volts) for the channel connected to the subscriber terminal in standby mode and simultaneously provide the required current (e.g., 25 mA) for the channel connected to the subscriber terminal in active mode. Power loss higher than 2 watts may thus occur when only one of the two subscriber terminals is in active mode. In order to reduce power loss while simultaneously keeping costs low (by minimizing the number of expensive circuit components), the exemplary multi-output switching power converter 220 of FIG. 4 is used in an SLIC, as discussed above with reference to FIG. 2. Before discussing FIG. 4, the basic switching converter of FIG. 3 is briefly explained.

Input voltage V is applied across a series circuit of semiconductor switch $S_1$ and inductor $L_1$. The series circuit is connected between an input circuit node (at which input voltage $V_{IN}$ is provided) and a reference potential, e.g., ground potential. The common circuit node $N_1$ of this series circuit (i.e., the middle tap between semiconductor switch $S_1$ and inductor $L_1$) is connected to the cathode of diode $D_1$. The cathode of diode $D_1$ is connected to circuit node $N_2$, which is coupled to the reference potential, e.g., ground potential, via a first capacitor $C_1$. In essence, the output voltage could be tapped at circuit node $N_2$. However, an RC low-pass is used to reduce the output voltage ripple. That is, the output voltage is provided at circuit node $N_3$, which is connected to circuit node $N_2$ via resistor $R_1$ and to the reference potential via the second capacitor $C_2$. It can be seen that resistor $R_1$ and the second capacitor $C_2$ form an RC low-pass. Output voltage $V_{OUT}$ depends on input voltage $V_{IN}$ and the switching operation of semiconductor switch $S_1$, which is usually controlled by a controller circuit; this is known as such and thus omitted in the present illustration of FIG. 3. Inductor $L_1$, semiconductor switch $S_1$, and diode $D_1$, which has to be a fast recovery diode, are the most cost-intensive circuit components. The first capacitor $C_1$ should be a ceramic capacitor, whereas the second capacitor may be an electrolytic capacitor.

The multi-output switching converter 220 of FIG. 4 includes a (e.g., single-output) switching power converter circuit that provides one intermediate voltage signal $V_{C1}$ and two output branches for distributing the voltage level of $V_{C1}$ to the outputs of the multi-output switching converter 220. In the present example, the multi-output switching converter has two outputs providing first and second output voltage signals $V_{OUT1}$ and $V_{OUT2}$, respectively. However, further output branches could be provided dependent on the actual application. These output voltage signals $V_{OUT1}$ and $V_{OUT2}$ depend on the intermediate voltage $V_{C1}$. The switching power converter circuit, which provides the intermediate voltage signal $V_{C1}$, includes semiconductor switch $S_1$, inductor $L_1$ and the first capacitor $C_1$, and is set up analogously to the previous example of FIG. 3. Accordingly, input voltage $V_{IN}$ is applied across a series circuit of semiconductor switch $S_1$ and inductor $L_1$. The series circuit is connected between an input circuit node (at which input voltage $V_{IN}$ is provided) and a reference potential, e.g., ground potential GND. The common circuit node $N_1$ of this series circuit (i.e., the middle tap between semiconductor switch $S_1$ and inductor $L_1$) is connected to the cathode of diode $D_1$. The cathode of diode $D_1$ is connected to circuit node $N_2$, which is coupled to the reference potential, e.g., ground potential, via a first capacitor $C_1$. The voltage signal across capacitor $C_1$ is the intermediate voltage signal $V_{C1}$ mentioned above. Therefore, circuit node $N_2$ could be regarded as the output of a single-output switching power converter that provides, as an output signal, the intermediate voltage signal $V_{C1}$. The intermediate voltage signal $V_{C1}$ depends on the input voltage and the switching operation of semiconductor switch $S_1$, which is controlled by control circuit CTL.

Different from the previous example, circuit node $N_2$ is connected to two separate output branches. The first output branch includes diode $D_2$, resistor $R_2$ and a first output capacitor $C_2$, and the second output branch includes another diode $D_3$, another resistor $R_3$ and a second output capacitor $C_3$. It should be noted that the diodes D2 and D3 can be generally regarded as semiconductor switches which are configured to prevent a discharging of the output capacitors $C_2$ and $C_3$, respectively, via the circuit node $N_2$. The diodes $D_2$ or $D_3$ could be replaced by, e.g., by appropriately driven semiconductor switches. The output circuit nodes of the output branches, at which output voltage signals $V_{OUT1}$ and $V_{OUT2}$ are provided, are denoted as circuit nodes $N_3$ and $N_4$, respectively. Accordingly, circuit node $N_2$ (at which the intermediate voltage signal $V_{C1}$ is provided) is connected to the first output node $N_3$ (at which the first output voltage $V_{OUT1}$ is provided) via a series circuit of diode $D_2$ and resistor $R_2$. Additionally, circuit node $N_2$ is also connected to the second output node $N_4$ (at which the second output voltage $V_{OUT2}$ is provided) via a series circuit of diode $D_3$ and resistor $R_3$. Both output nodes $N_3$ and $N_4$ are connected to reference potential via the output capacitors $C_2$ and $C_3$, respectively. Similar to the previous example, resistor $R_2$ and capacitor $C_2$ form a first RC low-pass, while resistor $R_3$ and capacitor $C_3$ form a second RC low-pass. Diodes $D_2$ and $D_3$ prevent an undesired discharging of capacitor $C_1$ when output voltages $V_{OUT1}$ and $V_{OUT2}$ are lower than voltage $V_{C1}$ at circuit node $N_2$. Output voltages $V_{OUT1}$ and $V_{OUT2}$ depend on input voltage $V_{IN}$ and the switching operation of semiconductor switch $S_1$, which is controlled by control circuit CTL.

Figure 5:
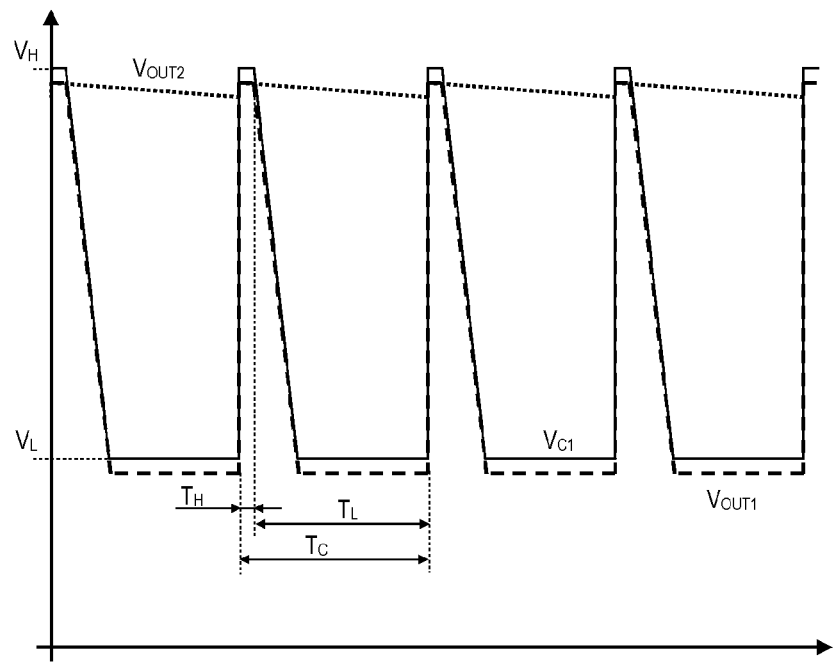
FIG. 5 is a timing diagram illustrating the output voltages generated by the switching power converter circuit of FIG. 3.

Control circuit CTL generates an appropriate drive signal for semiconductor switch $S_1$, which may be of any type such as an MOS transistor or a bipolar junction transistor. For control purposes, the control circuit may receive a feedback signal representing voltage $V_{C1}$ or either of the output voltages $V_{OUT1}$ or $V_{OUT2}$. The operation of the switching power converter is illustrated using the timing diagram of FIG. 5. According to the example of FIG. 5, the control circuit is configured to drive semiconductor switch $S_1$ cyclically on and off such that the intermediate voltage signal $V_{C1}$ is at a first level $V_H$ (e.g., 42 volts) for a relatively short first time interval $T_H$ (e.g., $T_H$=1 ms) and then at a second lower level $V_L$ (e.g. 7.5 volts) for a relatively long second time interval $T_L$ (e.g., $T_L$=9 ms). In the present example, the first voltage level $V_H$ is generated regularly following a cycle time of $T_c = T_H + T_L$. However, the first voltage level is not necessarily repeated at a fixed frequency. One exemplary waveform of the generated voltage $V_{C1}$ is illustrated in FIG. 5. It should be noted that the intermediate voltage $V_{C1}$ and output voltages $V_{OUT1}$ and $V_{OUT2}$ may also be negative. It should also be noted that, when referring to a "high voltage level" or a "low voltage level", it is the magnitude (absolute value) of the voltage level that is referred to. A voltage level of −40 volts is thus considered a high voltage level as compared to a low voltage level of −7.5 volts.

For further discussion, it is assumed that output voltage $V_{OUT1}$ is supplied to interface circuit 211 connected to subscriber terminal 11 that is in active mode, whereas output voltage $V_{OUT2}$ is supplied to interface circuit 212 connected to subscriber terminal 12 that is in standby mode. Accordingly, approximately zero current is provided to subscriber loop L12 (standby), whereas a desired load current (e.g., 25 mA) is provided to subscriber loop L11 (active). During time interval $T_H$, capacitor $C_1$ and output capacitors $C_2$ and $C_3$ are charged to approximately the same voltage $V_H$ (when neglecting the voltage drop across diodes $D_2$ and $D_3$). Therefore, output voltages $V_{OUT1}$ and $V_{OUT2}$ are at the desired high level $V_H$ during time interval $T_H$. During time interval $T_L$, the intermediate voltage signal $V_{C1}$ drops to the low level $V_L$. Nevertheless, output voltage $V_{OUT2}$ remains at a relatively high level and drops only slightly during the subsequent time interval $T_L$ as the connected subscriber terminal 12 is in standby mode and sinks only a very low quiescent current. Simultaneously, subscriber terminal 12, which is in active mode, sinks the desired current (e.g., 25 mA); capacitor $C_2$ thus discharges relatively quickly and, as a result, the corresponding output voltage drops to (approximately) the low level $V_L$. The corresponding waveforms of output voltages $V_{OUT1}$ and $V_{OUT2}$ are also depicted in FIG. 5.

Employing the switching scheme illustrated in FIG. 5 allows a significant reduction of power loss when only one of the two channels of SLIC 21 (see FIG. 2) is active while the other is in standby mode. The loss has been measured in a test setup and could be reduced from over 2 watts (one output voltage $V_{OUT}$ for both channels) to below 0.5 watts (multi-output switching converter of FIG. 4). Finally, it should be noted that the examples discussed above refer to a switching converter using an inverting buck-boost converter topology. However, other converter topologies (e.g. flyback converter, inverting boost converter, etc.) may be applied dependent on the requirements of the intended application.

Although various exemplary embodiments of the proffered solution have been disclosed, it will be apparent to those skilled in the art that various changes and modifications can be made that will achieve some of the advantages of the proffered solution without departing from the spirit and scope of the proffered solution. It will be obvious to those reasonably skilled in the art that other components performing the same functions may be suitably substituted. It should be mentioned that features explained with reference to a specific figure may be combined with features of other figures, even in those where not explicitly been mentioned. Furthermore, the methods of the proffered solution may be achieved in either all software implementations using the appropriate processor instructions or in hybrid implementations that utilize a combination of hardware logic and software logic to achieve the same results. Such modifications to the inventive concept are intended to be covered by the appended claims.

I claim:

1. An apparatus for a subscriber line interface, the apparatus including a first interface operably coupled to a first subscriber loop, a second interface operably coupled to a second subscriber loop, and a power supply coupled to the first and the second interface to provide a first and a second output voltage to the first and second interface, respectively, the apparatus comprising:
   a switch unit operably supplied with an input voltage and configured to provide an intermediate voltage signal;
   at least a first and a second output branch, each output branch provides an output voltage signal that is dependent on the intermediate voltage signal,
   wherein the switch unit is configured to set the signal level of the intermediate voltage signal to a high voltage level for a first time interval and to a low voltage level when the first time interval has elapsed.

2. The switch unit of claim 1, wherein each output branch includes an RC low-pass circuit.

3. The switch unit of claim 1, wherein each output branch includes an LC low-pass circuit.

4. The switch unit of claim 1, wherein each output branch comprises a diode and a resistor, which are coupled in series, the resistor and the output capacitor of each output branch forming an RC low-pass, and the diode connecting an intermediate node of the at least first and second output branch and the RC low-pass.

5. The switch unit of claim 1, wherein each output branch comprises a diode, a capacitor and an inductor, which are coupled in series, the inductor and the capacitor of each output branch forming an LC low-pass circuit, and the diode connecting to the LC low-pass circuit.

6. The switch unit of claim 4, wherein, in each output branch, the diode is arranged such that discharging of the capacitor via the intermediate node is prevented by the diode.

7. The switch unit of claim 1, wherein the switch unit is configured to set a signal level of the intermediate voltage signal cyclically and with a cycle time to a high voltage level for a first time interval and to a low voltage level when the first time interval has elapsed.

8. The switch unit of claim 7, wherein a ratio of the first time interval and the cycle time defines a duty cycle, and wherein the duty cycle is equal to or lower than 0.1 (10%).

9. The switch unit of claim 7, wherein the first time interval is smaller than 10 ms and the cycle time is smaller than 100 ms.

10. The switch unit of claim 1, wherein the switch unit includes an inductor, a semiconductor switch and a capacitor coupled to a downstream node providing a reference potential.

11. The switch unit of claim 10, wherein the inductor, the semiconductor switch and the capacitor are arranged in accordance with an inverting buck-boost converter topology.

12. A method for supplying power to a first and a second subscriber terminal operably coupled to corresponding first and second subscriber loops, the method comprising the steps of:

repeatedly charging a first and a second capacitor to a high voltage level during a first time interval, and preventing discharging of the first and second capacitors to voltage levels lower than a given low voltage level when the first time interval has elapsed, wherein the first and second capacitors provide power to the first and second subscriber terminals, respectively, via corresponding interfaces coupled to the respective subscriber terminals by the respective subscriber loops.

13. The method of claim 12, wherein charging the first and second capacitors is initiated cyclically in accordance with a cycle time.

14. The method of claim 13, wherein a ratio of the first time interval and the cycle time defines a duty cycle, and wherein the duty cycle is equal to or lower than 0.1 (10%).

15. The method of claim 13, wherein the first time interval is smaller than 10 ms and the cycle time is smaller than 100 ms.

16. The method of claim 12, wherein the first and second capacitors are each charged by a controllable voltage source via corresponding first and second resistors and first and second diodes, respectively.

17. The method of claim 16, wherein the diode prevents a discharging of the first and second capacitors via the controllable voltage source.

18. The method of claim 16, wherein the controllable voltage source is a switch unit.

19. The method of claim 16, wherein the first and second capacitors and the corresponding first and second resistors form first and second RC low-pass filters.

* * * * *